United States Patent [19]

Heimbuch

[11] Patent Number: 5,778,771
[45] Date of Patent: Jul. 14, 1998

[54] VEGETABLE TOPPER

[76] Inventor: Thomas A. Heimbuch, R.R. #1, Box 70, Cogswell, N. Dak. 58017

[21] Appl. No.: 711,262

[22] Filed: Sep. 9, 1996

[51] Int. Cl.⁶ .......................... A23N 7/00; A23N 15/02; A23N 15/04
[52] U.S. Cl. .................... 99/637; 99/546; 99/635; 99/639; 99/640; 99/642; 99/643
[58] Field of Search .................. 99/635–643, 516, 99/584, 586, 567, 540, 546; 56/126, 157, 327.1, 13.9–14.3; 171/1, 11, 17, 25–28, 31, 36, 41; 198/393, 384, 803.7, 954; 426/480–483, 509

[56] References Cited

U.S. PATENT DOCUMENTS

| | | | |
|---|---|---|---|
| 3,389,731 | 6/1968 | Teigen | 146/83 |
| 3,515,193 | 6/1970 | Aguilar | 146/224 |
| 3,597,909 | 8/1971 | Lauridsen et al. | 56/327 |
| 3,621,900 | 11/1971 | Rood | 99/636 |
| 3,623,524 | 11/1971 | Buck | 146/43 |
| 3,638,697 | 2/1972 | Krekelberg | 146/83 |
| 3,646,978 | 3/1972 | Tait | 146/83 |
| 3,724,362 | 4/1973 | Parsons | 99/584 X |
| 3,764,717 | 10/1973 | Rood | 426/481 |
| 3,847,070 | 11/1974 | Draggett | 99/643 |
| 3,861,295 | 1/1975 | Boyer | 99/584 X |
| 4,031,821 | 6/1977 | Loose et al. | 99/643 |
| 4,068,011 | 1/1978 | Green et al. | 426/482 |
| 4,202,261 | 5/1980 | Lawson | 99/636 |
| 4,373,589 | 2/1983 | Hagiz | 171/31 |
| 4,450,762 | 5/1984 | Lustig | 426/482 X |
| 4,476,778 | 10/1984 | Clyma | 99/636 X |
| 4,602,559 | 7/1986 | Suzuki et al. | 99/636 X |
| 4,753,296 | 6/1988 | Kruithoff | 171/26 |
| 5,058,369 | 10/1991 | Garner | 56/13.9 |
| 5,197,549 | 3/1993 | Shuff | 171/17 |
| 5,431,000 | 7/1995 | Shuknecht | 56/308 |
| 5,431,231 | 7/1995 | Abe et al. | 171/25 X |

*Primary Examiner*—Timothy F. Simone
*Attorney, Agent, or Firm*—Sheridan Ross P.C.

[57] ABSTRACT

A vegetable topper is disclosed. In one embodiment, the topper includes a plurality of spaced rollers which are mounted on a pair of laterally spaced roller chain loops such that the rollers are able to freely spin relative to the roller chains. The rollers define a bed on which vegetables may be positioned and the flow of vegetables along the bed is generally perpendicular to the rotational axes of the rollers. A pair of laterally spaced traction members engage the lower surface of the rollers on the "upper" portion of the roller chain loops which define the bed such that the rollers of the bed are spun by relative movement between the roller chain loops and these belts. At least two cutter blades are disposed below the bed and cut vegetable tops which extend below a pair of adjacent rollers to provide a self-cleaning feature. A paddle wheel is disposed between these two cutter blades. Adjustment of the position of vegetables on the bed by the paddle wheel, particularly those vegetables which were not topped by the first cutter blade, increases the potential for these vegetables being topped by the second cutter blade which thereby increases the topping efficiency.

39 Claims, 6 Drawing Sheets

1

VEGETABLE TOPPER

FIELD OF THE INVENTION

The present invention generally relates to the field of vegetable toppers and, more specifically, to a topper with self-cleaning features and/or increased topping efficiencies.

BACKGROUND OF THE INVENTION

Various types of vegetable toppers are known. One machine used for topping onions is commonly referred to as a roll topper. A typical roll topper employs rotatably driven rollers or tubes which define a bed for receiving the onions to be topped. The bed of rotatably driven rollers are inclined to provide a gravity flow for the onions.

The rollers of a typical roll topper are situated in a parallel relation with the flow of the onions along the bed. Each roller is driven to rotate counter to the adjacently disposed and rotatably driven roller (i.e., adjacent rollers are driven to rotate in opposite directions). One or both of each pair of adjacent rollers has a raised edge that pulls the onion top down between the pair of oppositely driven rollers and shears the top off of the body of the onion. One disadvantage of a roll topper is that the onion may become bruised and rendered unacceptable for market when engaged and pulled down between a pair of oppositely driven rollers in the noted manner, particularly due to the engagement of the raised edge(s) on the body of the onion. Moreover, roll toppers are known to require rather lengthy and frequent cleanings.

Another machine which is used to remove the tops of onions is commonly referred to as a blade topper. A typical blade topper employs an inclined grate that forms a bed for receiving onions. A rotating blade is located below the grate to remove onion tops which extend below the grate. In order to increase the topping efficiency, some blade toppers employ a grate which is agitated or which shakes to reorient the onions on the grate. Blade toppers are known to have a very low topping efficiency so that several passes are required to remove most of the onion tops. Furthermore, during the topping process debris tends to get caught in the grate such that frequent cleaning of the grate is required.

SUMMARY OF THE INVENTION

The present invention generally relates to vegetable toppers which remove the ends of vegetables (e.g., onions). A first aspect of the present invention is directed to a vegetable topper which includes a plurality of spaced rollers which define a bed for the vegetables to be topped. The rollers are oriented in a non-parallel relation with the direction of movement of vegetables along the bed or the "flow" of the vegetables, and preferably the rollers are disposed substantially perpendicular to the flow of vegetables along the bed. A cutter blade assembly is disposed below the bed and removes portions of each vegetable which extend below a pair of rollers defining the bed, such as onion tops.

In one embodiment of this first aspect, the rollers which define the bed of the topper are each rotated in the same direction. The direction of rotation of these rollers may be such that the upper surfaces of the rollers are moving generally in the direction of the flow of vegetables along the bed. Advantages of this type of rotation of the rollers include reducing the potential for clogging of the spacing between the rollers, modification of the position of the vegetables within the space between the rollers, and the removal of dirt and other debris from the exterior surfaces of the vegetables. In another embodiment, the bed is moved generally in the direction of the flow of vegetables along the bed. Vegetables which are disposed in the space between adjacent pairs of rollers are thereby advanced by the cutter blade assembly such that the bed may be substantially horizontally disposed.

Movement of the bed in the above-noted manner may also be used to rotate the rollers. In this regard, a roller spinning assembly may be disposed below the bed and in engagement with the rollers of the bed such that a longitudinal movement of the rollers of the bed will also cause the rollers to rotate or spin. Longitudinal movement of the bed may be provided by mounting the rollers on at least one and preferably a pair of laterally spaced, continuous loop drive members (e.g., a pair of roller chains, a pair of belts) with pegs or an axle for interfacing with each of the rollers. Spinning of the rollers may then be provided by disposing at least one traction member below the bed to engage a portion of the lower surface of the rollers of at least the bed (e.g., the traction member may be of a material having a coefficient of friction to rotate the rollers when engaged therewith). Preferably, a pair of laterally spaced traction members engage the two end portions of the rollers of the bed such that there is a space in the mid portion of the rollers of the bed for allowing vegetable tops to extend below the spaced rollers for topping by the cutter blade assembly.

As the two continuous loop drive members are driven to longitudinally move the rollers along the bed (e.g., the rollers which are currently on the upper portion of the loops define the bed which receives vegetables in this case), the rollers of the bed will be forced to spin in the same direction by the relative movement between the rollers of the bed and the traction member(s). Relative movement may be provided by having the traction member(s) in a fixed or stationary position and by driving the drive member loops. Alternatively, the traction member(s) could also be moved at a different rate and/or direction in relation to the continuous loop drive member(s) movement.

In yet another embodiment of this first aspect of the present invention, the cutter blade assembly includes a first rotatable blade. Since this cutter blade assembly is disposed below the bed of rollers, the first rotatable blade may be rotated in a direction which generates a suction force to draw vegetable ends down below the bed between adjacent and spaced rollers. In another embodiment, the cutter blade assembly includes at least two longitudinally spaced blades. Vegetables which are moving along the bed and not topped by the first blade may therefore be topped by the second blade which is disposed "downstream" of the first blade.

In yet another embodiment of this first aspect of the present invention, the vegetable topper further includes a device for reorienting the vegetables on the bed defined by the plurality of rollers. This device may be disposed below the bed so as to engage vegetables in the area between adjacent spaced rollers. At least one paddle wheel with one or more fins may be rotatably mounted below the bed such that the fin(s) would engage the vegetables in the space between adjacent rollers to provide this "position adjustment" function. Positioning this paddle wheel between a pair of longitudinally spaced cutter blades increases the potential for vegetable ends which were not removed at the first cutter blade because of an improper orientation to be positionally adjusted for topping at the second cutter blade.

A second aspect of the present invention relates to a vegetable topper which adjusts the position of the vegetables to increase the topping efficiency. The topper includes a bed having a plurality of apertures and a longitudinal extent which generally coincides with the direction of the flow of vegetables along the bed. At least two longitudinally spaced cutter blade assemblies (i.e., one being "downstream of the other) are disposed below the bed and a device which adjusts the position of the vegetables on the bed is disposed between these two cutter blade assemblies. Vegetables which are not topped by the first cutter blade assembly (e.g., because of lying "sideways" on the bed) may be repositioned by the noted device such that these vegetables may be topped by the second cutter blade assembly. The topping efficiency of the topper is thereby improved. Each of the above-noted features discussed in relation to the first aspect of the invention may be used in this second aspect of the invention. As such, the noted repositioning device of this second aspect may be the above-discussed paddle wheel(s).

DETAILED DESCRIPTION

Figure 1:
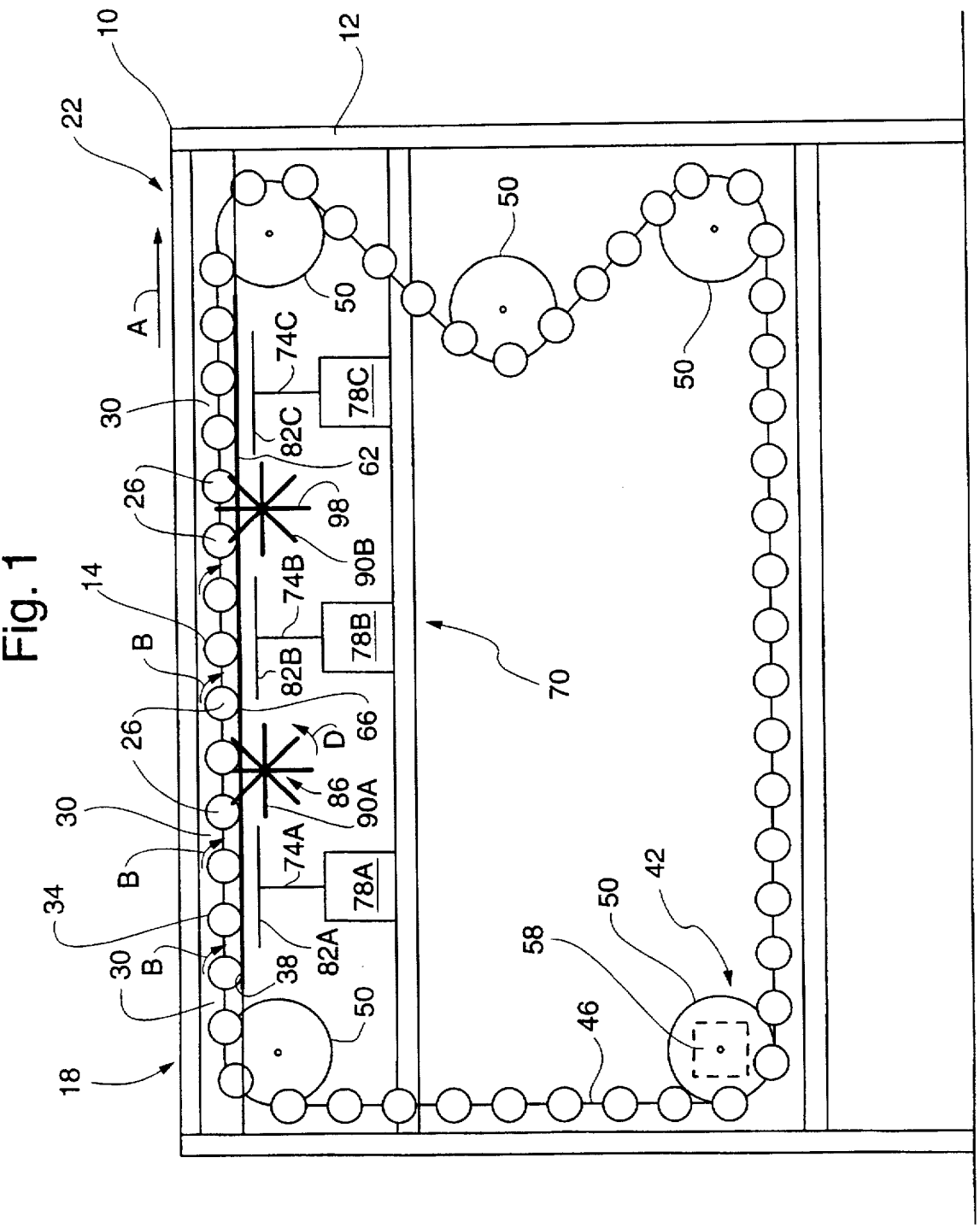
FIG. 1 is a cutaway side view of one embodiment of a vegetable topper.
Figure 2:
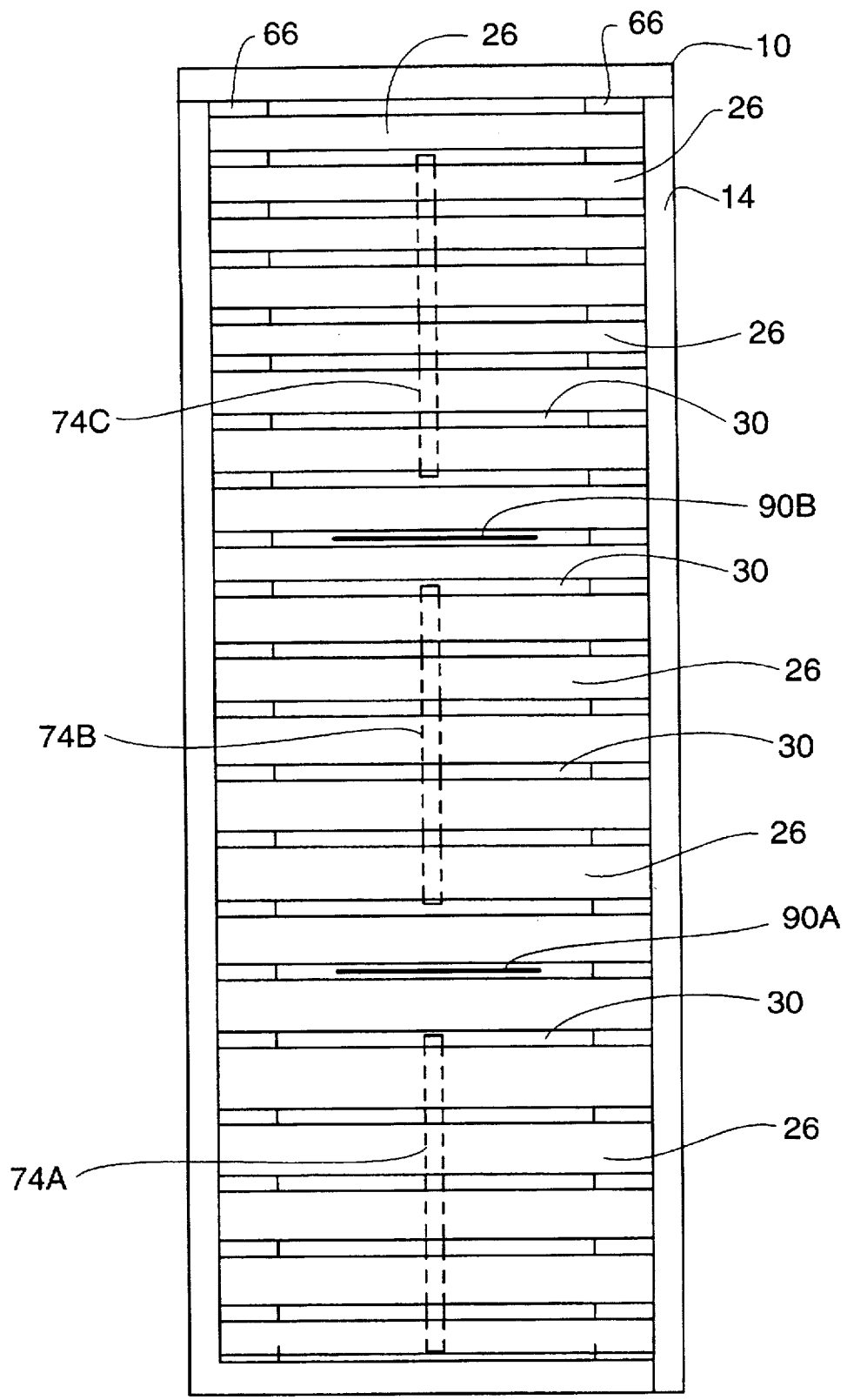
FIG. 2 is a top view of the vegetable topper of FIG. 1.
Figure 6:
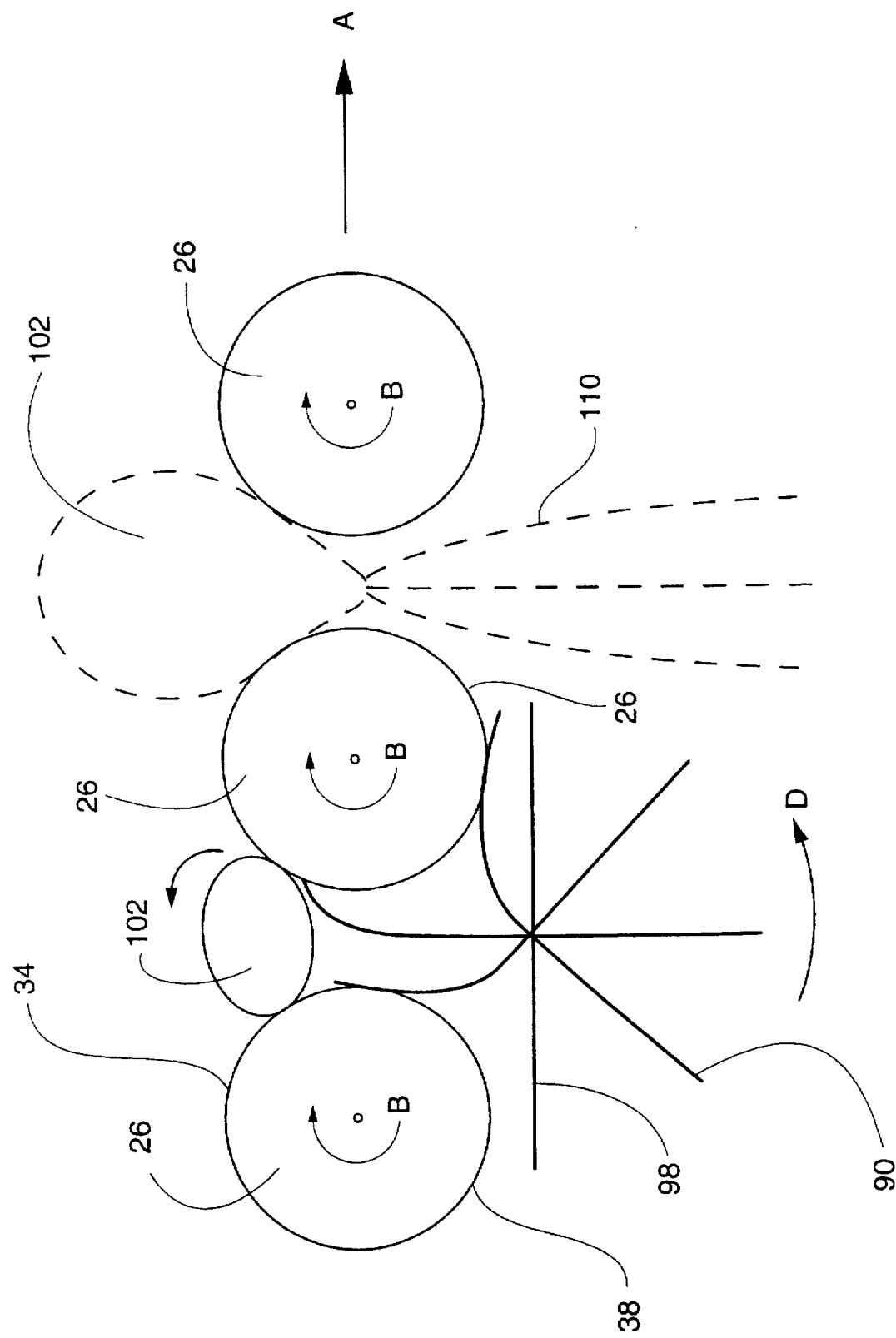
FIG. 6 is a side view illustrating the interaction of the paddle wheel of FIG. 5 with a vegetable disposed between two adjacent rollers of the bed of the vegetable topper of FIG. 1.

The present invention will be described in relation to the accompanying drawings which assist in the illustration of its various pertinent features. Referring initially to FIGS. 1–2, the vegetable topper 10 includes an appropriate frame 12 which supports all components of the topper 10, directly or indirectly. The topper 10 further includes a substantially horizontally disposed bed 14 that supports a plurality of vegetables 102 (e.g., onions illustrated in FIGS. 4, 6, and 7) which are to be topped and which may be continually loaded on the intake end 18 of the bed 14. The bed 14 is moved in the direction of the arrow A in FIG. 1 by a bed drive assembly 42 to advance the plurality of vegetables 102 by a cutter blade assembly 70. Vegetables 102 on the bed 14 which extend through apertures in the bed 14 have their tops removed as they pass the cutter blade assembly 70. Topping efficiencies are increased by a vegetable positioner assembly 86 which alters the position of the vegetables 102 on the bed 14 so as to increase the potential for their respective tops being removed. The topped vegetables 102 are then removed from the bed 14 at its output end 22.

Figure 3:
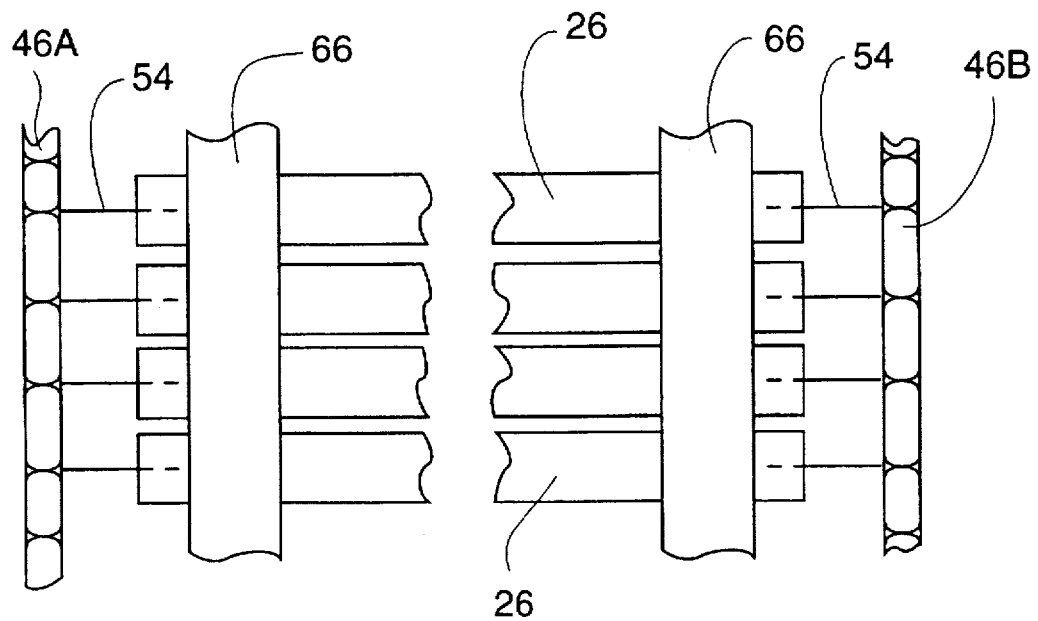
FIG. 3 is a bottom view of a portion of the vegetable topper of FIG. 1.
Figure 5:
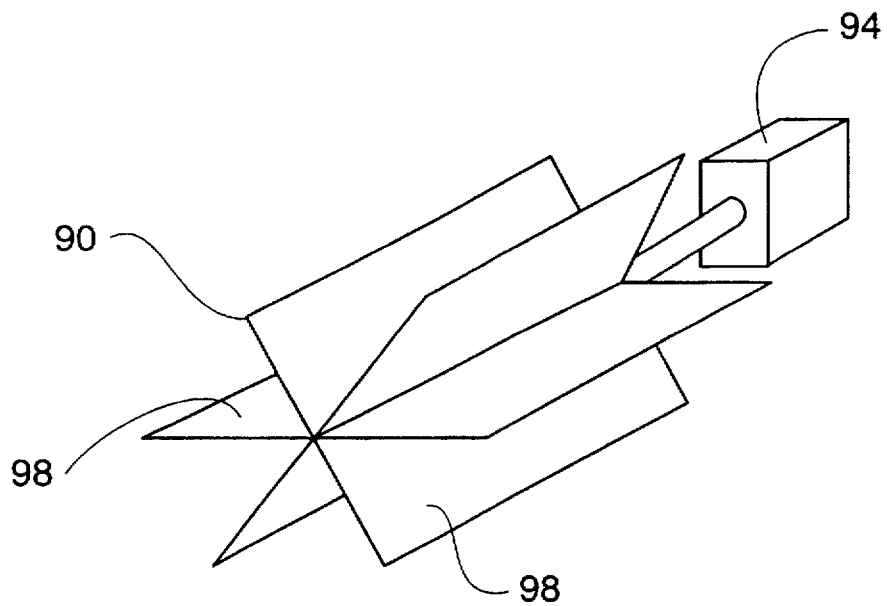
FIG. 5 is a perspective view of a paddle wheel for a vegetable positioner assembly of the vegetable topper of FIG. 1.

The bed 14 of the vegetable topper 10 is defined by a plurality of rollers or tubes 26 in which there is a space or opening 30 between each pair of adjacent rollers 26 as illustrated in FIGS. 1–3. These plurality of spaces 30 within the bed 14 provide the above-noted apertures through which the tops 110 of the vegetables 102 extend (FIGS. 6 and 7) to be topped by the cutter blade assembly 70. The vegetables 102 are also advanced along the bed 14 by being retained within one of these spaces 30 for topping in a manner to be discussed in more detail below.

The rollers 26 are disposed in substantially parallel relation such that their respective rotational axes are disposed in substantially parallel relation to each other. The rollers 26 are also disposed such that their respective rotational axes are disposed substantially perpendicular to the "flow" or direction of movement of the vegetables 102 along the bed 14 as illustrated in FIG. 2. That is, the rollers 26 are oriented to be perpendicular to the direction of the arrow A in FIG. 1.

The bed 14 is defined by the plurality of spaced rollers 26 which are advanced by the bed drive assembly 42 to advance the vegetables 102 past the cutter blade assembly 70 for topping. The bed drive assembly 42 is illustrated in FIGS. 1 and 3 and includes a pair of laterally spaced roller chain loops 46 which interface with a plurality of sprockets or gears 50. At least one of these sprockets or gears 50 is rotatably driven by an appropriate source (e.g., an electric motor 58) to cause the bed 14 to move in the direction of the arrow A in FIG. 1 in a clockwise direction. Each roller 26 interfaces with the pair of roller chain loops 46 in a manner such that the rollers 26 also move in the direction of the arrow A in FIG. 1 and further such that the rollers are able to rotate or spin freely relative to the roller chain loops 46 about their respective rotational axes.

Rotation of the rollers 26 may be provided by mounting each of the two ends of each roller 26 on one of a plurality of pegs 54 which are fixed onto the roller chain loops 46. The pegs 54 may extend partially into the interior of the rollers 26 as shown in FIG. 3, or alternatively could extend all the way through the rollers 26 to define an axle which would extend between the two laterally spaced roller chain loops 46 for mounting of a roller 26 thereon (not shown). Based upon this type of interface with the roller chain loops 46, it will be appreciated that the bed 14 of the topper 10 defined by rollers 26 continually advances in the direction of the arrow A in FIG. 1 in a clockwise direction about the system of sprockets 50.

In addition to moving in the direction of the arrow A in FIG. 1, the rollers 26 also simultaneously spin about their respective rotational axes due to the roller spinning assembly 62 which is illustrated in FIGS. 1–4. The roller spinning assembly 62 includes a pair of laterally spaced traction members 66 which engage the two end portions of the rollers 26 which define the bed 14. Each of the traction members 66 is mounted on a metal strip which is interconnected with the frame 12 of the topper 10 and are made of a material which provides for an appropriate frictional interface between the traction members 66 and the rollers 26 (e.g., a rubber coating on the metal strips). The traction members 66 engage a lower bed surface 38 defined by a plane containing the lower portions of the rollers 26 of the bed 14. Relative movement between the bed 14 and the traction members 66 cause the rollers 26 to spin about their respective rotational axes.

Figure 4:
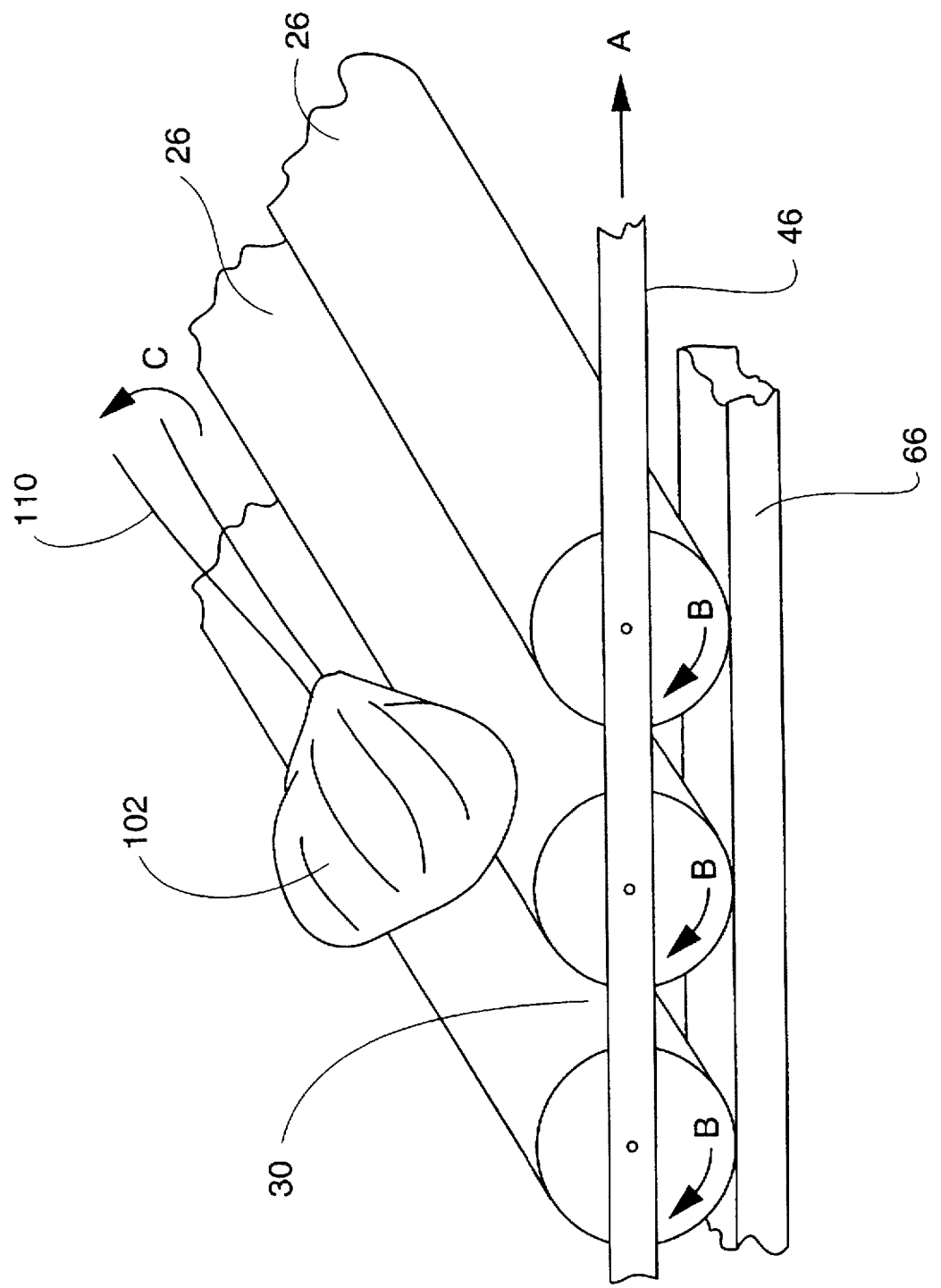
FIG. 4 is a perspective view of a portion of a roller spinning assembly for the vegetable topper of FIG. 1.

In the illustrated embodiment, the traction members 66 are maintained in a stationary position while the roller chain loops 46 are each rotated to advance the bed 14 in the direction of the arrow A in FIG. 1 which causes each of the rollers 26 to rotate in the direction of the arrow B in FIG. 1. This spinning movement of the rollers 26 of the bed 14 causes the vegetables 102 disposed in the spaces 30 to spin in the direction of the arrow C (FIG. 4). This spinning of the vegetables 102 is believed to improve the topping efficiency by repositioning the vegetables 102 such that their tops 110 extend down through the spacings 30 between the rollers 26. Moreover, the spinning of the rollers 26 also removes dirt and other debris from the vegetables 102 and also reduces the potential for the bed 12 becoming clogged with debris to provide a self-cleaning feature.

Figure 7:
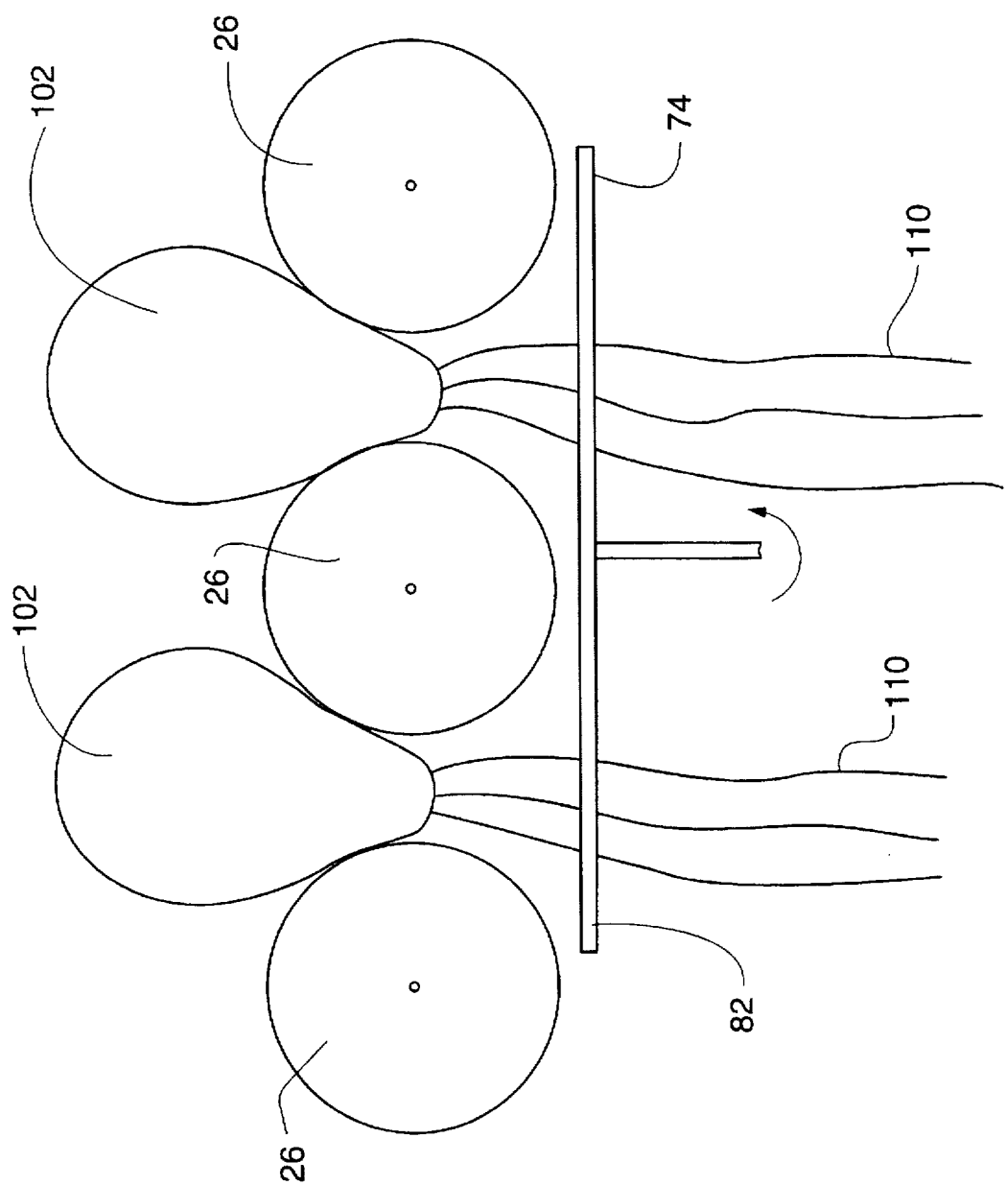
FIG. 7 is a side view illustrating the positioning of the vegetables on the bed of the vegetable topper of FIG. 1 during topping of the vegetables by a cutter blade.

The vegetables 102 are topped by the cutter blade assembly 70 which in the illustrated embodiment includes three cutters 74A, 74B, and 74C. These cutters 74A, 74B, and 74C are spaced along the bed 14 (e.g., they are longitudinally spaced). Each cutter 74 includes at least one blade 82 which is rotated by a motor 78. Topping efficiencies are increased by rotating the blades 82 in a direction such that a suction force is generated below the bed 14 to "draw" vegetable tops 110 below the lower bed surface 38 for topping by one or more of the cutters 74 as illustrated in FIG. 7. Specifically, air is drawn down below the bed 14 through the spacings 30 between the rollers 26 by the rotating blades 82 of the cutters 74. Although the illustrated embodiment includes three cutters 74, it should be appreciated that more cutters 74 could be used. Moreover, it should be appreciated that two cutters 74 could be used for one or more aspects of the present invention.

The topping efficiency of the vegetable topper 10 is further increased by the vegetable positioner assembly 86 which is illustrated in FIGS. 1, 2, 5, and 6. The vegetable positioner assembly 86 includes two longitudinally spaced paddle wheels 90 which are disposed below the bed 14. One paddle wheel 90 is disposed between each pair of cutters 74. Each paddle wheel 90 includes at least one and typically a plurality of flexible paddle wheel fins 98 and a paddle wheel motor 94 for rotating the fins 98 in the direction illustrated by the arrow D in FIGS. 1 and 6. The rotational axis of each of the paddle wheels 90 is generally parallel with the rotational axes of the rollers 26. As the paddle wheels 90 rotate, the fins 98 engage vegetables 102 disposed in the openings 30 to adjust the position of these vegetables 102 and may be deflected by engagement with the rollers 26 such that when they lose contact therewith they exert a force on the vegetable 102 to change its position (e.g., the fins 98 may have spring-like characteristics). This may entail changing the position of the particular vegetable 102 from a "prone" position where its central axis is disposed parallel to the rollers 26 (e.g., illustrated in the solid lines of FIG. 6), to a position where its central axis is at least generally vertically oriented such that the vegetable top 110 extends below the lower bed surface 38 for topping by the cutter blade assembly 70 (e.g., illustrated by the dashed lines of FIG. 6). Adjustment of the position of the vegetables 102 may also entail moving the vegetable 102 to another opening 30 in the bed 14 to increase the potential for the heavier top 110 of the vegetable 102 to fall down through one of the spacings 30 as also illustrated by the two vegetables 102 illustrated in FIG. 6. In any case, this repositioning of the vegetable 102 increases the topping efficiency of the topper 10.

Summarizing the operation of the topper 10, a plurality of vegetables 102 are continually loaded onto the bed 14 at its intake end 18. The bed 14 moves in the direction of the arrow A in FIG. 1 along a substantially horizontal path, as does each space 30 between each of the adjacent pair of rollers 26 on the bed 14. Vegetables 102 disposed in these spaces 30 are thereby also advanced in the direction of the arrow A in FIG. 1. Relative movement between the bed 14 and the traction members 66 of the roller spinning assembly 62 cause the rollers 26 of the bed 14 to spin in the direction of the arrow B in FIG. 1 as the rollers 26 are advanced in the direction of the arrow A in FIG. 1. This spinning of each of the rollers 26 in the same direction provides a number of functions. The potential for dirt and/or other debris becoming lodged in the spaces 30 between adjacent pairs of rollers 26 is reduced by the spinning of the rollers 26 which reduces the amount of time required to clean the topper 10. Vegetables 102 disposed in the spaces 30 defined by pairs of spinning rollers 26 are also spun which increases the potential for the vegetables 102 becoming oriented such that their associated tops 110 extend below the lower bed surface 38 for topping. The action of the spinning rollers 26 on the vegetable 102 also assists in the removal of dirt and other debris from the surface of the vegetable 102 without unduly harming the vegetable 102.

Movement of the spaces 30 in the direction of the arrow A in FIG. 1 causes the vegetables 102 disposed therein to move past the cutter 74A. Vegetable tops 110 which extend below the lower bed surface 38 as they pass over the cutter 74A will then be appropriately topped or cut off (e.g. see FIG. 7). Rotation of the cutter 74A in a direction which generates a suction force below the bed 14 increases the potential for the number of vegetables 102 which will be in an orientation in the spaces 30 to be topped at the cutter 74A by pulling down on the tops 110.

Vegetables 102 within the spaces 30 continue to be advanced in the direction of the arrow A in FIG. 1 from the cuter 74A toward the cutter 74B. Disposed between the cutter 74A and the cutter 74B is the paddle wheel 90A. Rotation of the paddle wheel 90A in the direction of the arrow D causes its fins 98 to project into the space 30 between adjacent rollers 26 to reorient vegetables 102 within this space 30. Vegetables 102 which were orientated with their respective central axis generally parallel with the rollers 26 are thereby moved such that the potential for their central axis assuming a more vertical orientation increases as it passes the second cutter 74B. Having the vegetable 102 with its central axis in a generally vertical orientation as it passes the cutter 74 increases the potential for the vegetable tops 110 to extend below the lower bed surface 38 for topping. Engagement of the vegetables 102 within the spaces 30 by the paddle wheel fins 98 may also move the vegetables 102 to another space 30 which further increases the potential for the vegetable 102 assuming the orientation required for topping.

After the vegetables 102 pass the second cutter 74B, they encounter a second paddle wheel 90B which functions similarly to the paddle wheel 90A. Specifically, the second paddle wheel 90B adjusts the position of one or more of the vegetables 102 within the spaces 30 passing thereby to increase the potential for the untopped vegetables 102 to be in proper position for topping by the third cutter 74C. Vegetables 102 are then appropriately deposited from the bed 14 at its output end 22.

The topper 10 provides a number of advantages over known devices. Initially, the spinning of the rollers 26 in the above-noted manner reduces the potential for the spaces 30 of the bed 14 becoming clogged which would require the topper 10 to be shut down for cleaning. This also significantly reduces the time required to clean the topper 10 at the end of each work day. Manipulating the position of the vegetables 102 on the bed 14 in the noted manner also improves the topping efficiency of the topper 10. The spinning of the rollers 26 causes the vegetables 102 to spin which is believed to increase the topping efficiency. Moreover, the use of the paddle wheel 90 between a pair of cutters 74 is further believed to increase the topping efficiency. Topping efficiencies close to 100% have been achieved which is significantly greater than known toppers.

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. A device for removing ends of vegetables, comprising:
a plurality of rotatable and spaced rollers defining a bed, wherein a flow of vegetables along said bed is in a non-parallel relation to a rotational axis of each of said rollers; and
a cutter blade assembly disposed below said bed, wherein said blade assembly removes ends of vegetables extending between at least one pair of adjacent said rollers.

2. A device for removing ends of vegetables according to claim 1, further comprising means for rotating each said roller in a first direction.

3. A device for removing ends of vegetables according to claim 2, wherein said first direction comprises an upper surface of each said roller moving generally in a direction of said flow of vegetables.

4. A device for removing ends of vegetables according to claim 1, further comprising means for moving said bed generally in a direction of said flow of vegetables.

5. A device for removing ends of vegetables according to claim 4, further comprising a roller spinning assembly disposed below said bed and engaged with said rollers of said bed, wherein a movement of said bed generally in said direction of said flow of vegetables by said means for moving and an engagement of said rollers of said bed by said roller spinning assembly causes said rollers of said bed to rotate.

6. A device for removing ends of vegetables according to claim 4, wherein each of said rollers comprises first and second ends, wherein said means for moving said bed comprises means for engaging said first and second ends of each said roller to allow said rollers to freely rotate.

7. A device for removing ends of vegetables according to claim 4, wherein each of said rollers comprises an axle, wherein said means for moving comprises first and second laterally spaced drive members each interconnected with said axle of each said roller, said plurality of rollers being freely rotatable relative to said first and second drive members.

8. A device for removing ends of vegetables according to claim 7, wherein said first and second drive members each comprise an endless loop.

9. A device for removing ends of vegetables according to claim 7, wherein said first and second drive members each comprise an endless chain.

10. A device for removing ends of vegetables according to claim 7, further comprising means for moving at least a portion of said first and second drive members generally in a direction of said flow of vegetables and at least one pin interconnecting each said axle of each said roller with each of said first and second drive members.

11. A device for removing ends of vegetables according to claim 7, further comprising a roller spinning assembly disposed under said bed and engaged with a lower surface of said rollers of said bed.

12. A device for removing ends of vegetables according to claim 11, wherein said roller spinning assembly comprises first and second laterally spaced traction members, said cutter blade assembly being at least partially disposed between said first and second traction members.

13. A device for removing ends of vegetables according to claim 1, wherein said rotational axis of each said roller is substantially perpendicular to said flow of vegetables.

14. A device for removing ends of vegetables according to claim 1, wherein said cutter blade assembly comprises a first rotatable blade.

15. A device for removing ends of vegetables according to claim 14, wherein said cutter blade assembly comprises means for generating a suction force below said bed, said means for generating comprising means for rotating said first rotatable blade in a first direction.

16. A device for removing ends of vegetables according to claim 1, wherein said bed has a longitudinal extent generally coinciding with a direction of said flow of vegetables, wherein said cutter blade assembly comprises first and second longitudinally spaced blades.

17. A device for removing ends of vegetables according to claim 16, further comprising a paddle wheel disposed between said first and second blades to engage vegetables on said bed between at least one pair of adjacent said rollers.

18. A device for removing ends of vegetables according to claim 16, further comprising means for adjusting a position of said vegetables on said bed, said means for adjusting being disposed below said bed between said first and second blades and engaging at least one of said vegetables between at least one pair of adjacent said rollers.

19. A device for removing ends of vegetables according to claim 1, further comprising means for adjusting a position of said vegetables on said bed, said means for adjusting being disposed below said bed and engaging said vegetables between at least one pair of adjacent said rollers.

20. A device for removing ends of vegetables according to claim 19, wherein said means for adjusting comprises a paddle wheel.

21. A device for removing ends of vegetables according to claim 20, wherein said paddle wheel comprises a plurality of fins radially affixed about a common point.

22. A device for removing ends of vegetables according to claim 21, wherein said paddle wheel is rotatably mounted below said bed, wherein said fins freely engage said vegetables between at least one pair of adjacent said rollers.

23. A device for removing ends of vegetables, comprising:
a bed having a plurality of apertures, wherein said bed has a longitudinal extent generally coinciding with a direction of a flow of vegetables along said bed;
first and second longitudinally spaced cutter blade assemblies disposed below said bed; and
means for adjusting a position of said vegetables on said bed, said means for adjusting being disposed below said bed and engaging at least one of said vegetables between said first and second cutter blade assemblies.

24. A device for removing ends of vegetables according to claim 23, wherein said bed comprises a plurality of rotatable and spaced rollers, said plurality of apertures being defined by an area between a pair of adjacent said rollers.

25. A device for removing ends of vegetables according to claim 24, further comprising means for rotating each said roller in a first direction.

26. A device for removing ends of vegetables according to claim 25, wherein said first direction comprises an upper surface of each said roller moving generally in a direction of said flow of vegetables.

27. A device for removing ends of vegetables according to claim 24, further comprising means for moving said bed generally in a direction of said flow of vegetables.

28. A device for removing ends of vegetables according to claim 27, further comprising a roller spinning assembly disposed below said bed and engaged with at least one of said rollers, wherein a movement of said bed generally in said direction of said flow of vegetables by said means for moving and an engagement of said at least one roller of said bed by a roller spinning assembly causes said at least one roller of said bed to rotate.

29. A device for removing ends of vegetables according to claim 27, wherein each of said rollers comprises first and second ends, wherein said means for moving said bed comprises means for engaging said first and second ends of each said roller to allow said rollers to freely rotate.

30. A device for removing ends of vegetables according to claim 27, wherein each of said rollers comprises an axle, wherein said means for moving comprises first and second laterally spaced drive members each interconnected with said axle of each said roller, said plurality of rollers being freely rotatable relative to said first and second drive members.

31. A device for removing ends of vegetables according to claim 30, wherein said first and second drive members each comprise an endless loop.

32. A device for removing ends of vegetables according to claim 30, wherein said first and second drive members each comprise an endless chain.

33. A device for removing ends of vegetables according to claim 30, further comprising means for moving at least a portion of said first and second drive members generally in a direction of said flow of vegetables and at least one pin interconnecting each said axle of each said roller with each of said first and second drive members.

34. A device for removing ends of vegetables according to claim 27, further comprising a roller spinning assembly disposed under said bed and engaged with a lower surface of said rollers of said bed.

35. A device for removing ends of vegetables according to claim 34, wherein said roller spinning assembly comprises first and second laterally spaced traction members, said cutter blade assembly being at least partially disposed between said first and second traction members.

36. A device for removing ends of vegetables according to claim 24, wherein said rotational axis of each said roller is substantially perpendicular to said flow of vegetables.

37. A device for removing ends of vegetables according to claim 23, wherein said first and second cutter blade assemblies comprise first and second rotatable blades.

38. A device for removing ends of vegetables according to claim 37, wherein said first and second cutter blade assemblies comprise means for generating a suction force below said bed, said means for generating comprising means for rotating said first and second rotatable blades in a first direction.

39. A device for removing ends of vegetables according to claim 23, wherein said means for adjusting a position of said vegetables on said bed comprises a paddle wheel to engage at least one of said vegetables on said bed between said plurality of apertures.

* * * * *